United States Patent [19]

Peterson

[11] 4,151,405
[45] Apr. 24, 1979

[54] FERROMAGNETIC MARKER PAIRS FOR DETECTING OBJECTS HAVING MARKER SECURED THERETO, AND METHOD AND SYSTEM FOR ACTIVATING, DEACTIVATING AND USING SAME

[76] Inventor: Glen Peterson, 540 S. 83rd E. Ave., Tulsa, Okla. 74112

[21] Appl. No.: 699,523

[22] Filed: Jun. 24, 1976

[51] Int. Cl.² .................. G06K 5/00; G06K 19/06; G08B 13/26; H04B 7/14
[52] U.S. Cl. .................. 235/382; 235/493; 325/8; 340/572; 343/787
[58] Field of Search .......... 235/61.12 M, 61.11 D, 235/449, 450, 493; 335/284; 340/280, 258 R; 360/2; 325/8; 343/787

[56] References Cited

U.S. PATENT DOCUMENTS

| | | | |
|---|---|---|---|
| 3,154,761 | 10/1964 | O'Gorman | 235/61.7 B |
| 3,651,312 | 3/1972 | Barney | 235/61.12 M |
| 3,803,634 | 4/1974 | Namikawa | 235/61.12 M |
| 3,823,405 | 7/1974 | Andreaggi et al. | 235/61.12 M |
| 3,862,399 | 1/1975 | Cain | 235/61.12 M |
| 3,896,292 | 7/1975 | May et al. | 235/61.12 M |
| 3,998,160 | 12/1976 | Pearce | 235/61.12 M |

Primary Examiner—Daryl W. Cook

[57] ABSTRACT

An activatable, and deactivatable ferromagnetic marker useful in tagging objects to permit selective detection of tagged objects depending upon the activation state of the marker. The marker comprises a pair of ferromagnetic elements capable of generating harmonics of an exciting oscillatory interrogating field. Both elements of each pair are essentially identical, having identical dimensions, weights and ferromagnetic properties. In one activation state, the pair generates predominately the even harmonics of the oscillatory field, while in a second activation state the pair generates predominately the odd harmonics of the oscillatory interrogating field. The system includes the marker attached to, or built within, selected objects, a means for selectively switching between the two activation states, an interrogation field, and detection means. In view of the fact that in today's technology, each marker pair can be balanced to a high degree of accuracy, and the fact that the two states of activation are precise, high sensitivity and certainty of responses are both possible.

22 Claims, 26 Drawing Figures

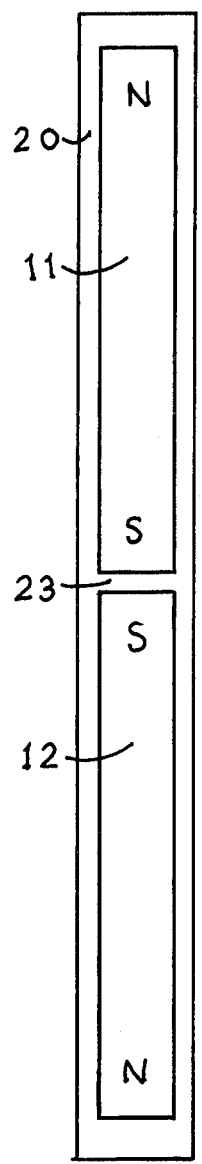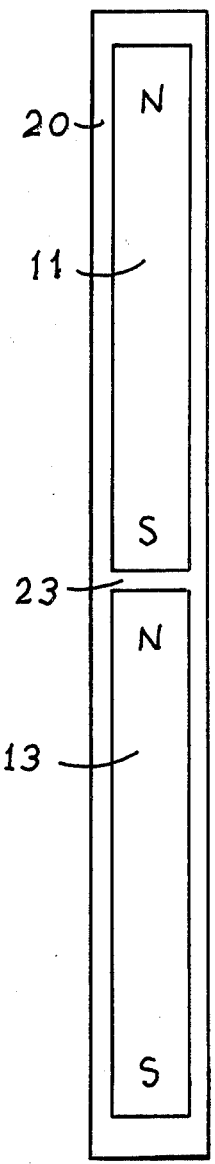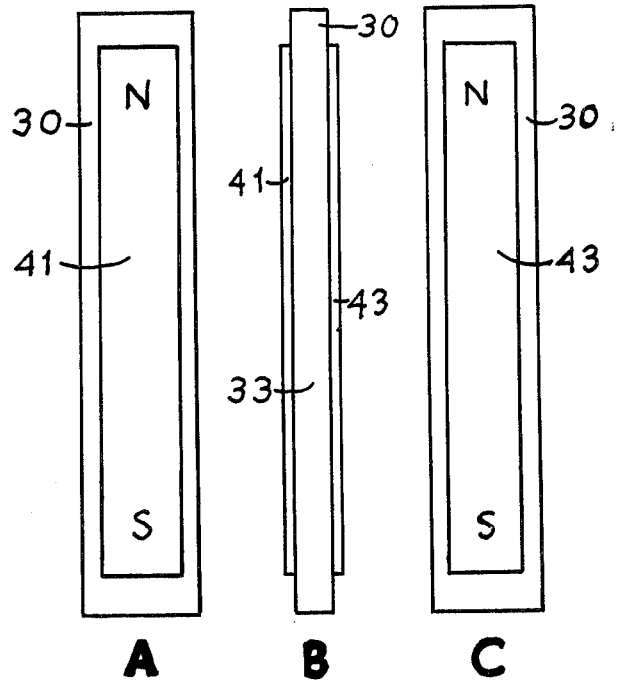
FIG. 1   FIG. 2   FIG. 3
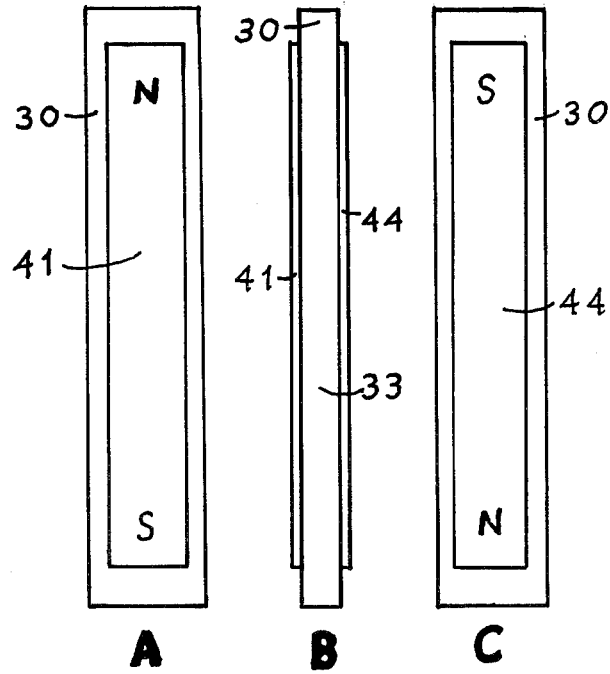
FIG. 4

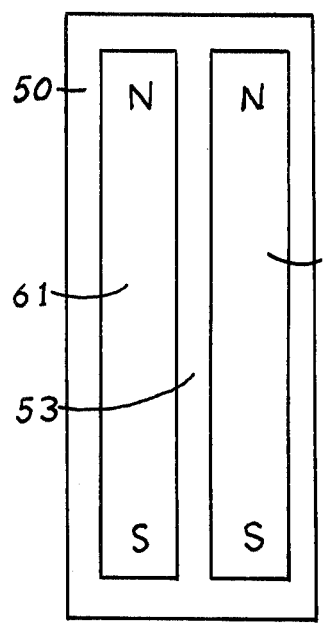
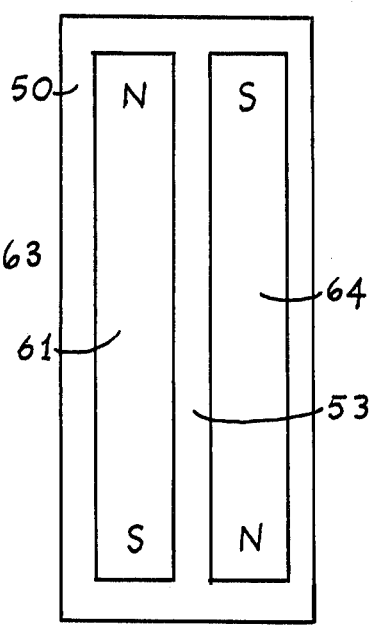
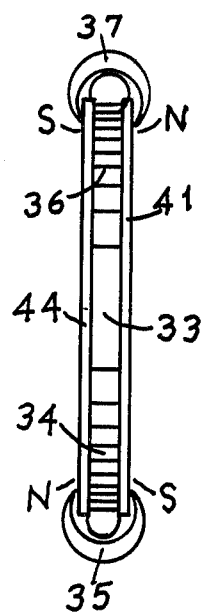
FIG. 5   FIG. 6   FIG. 10
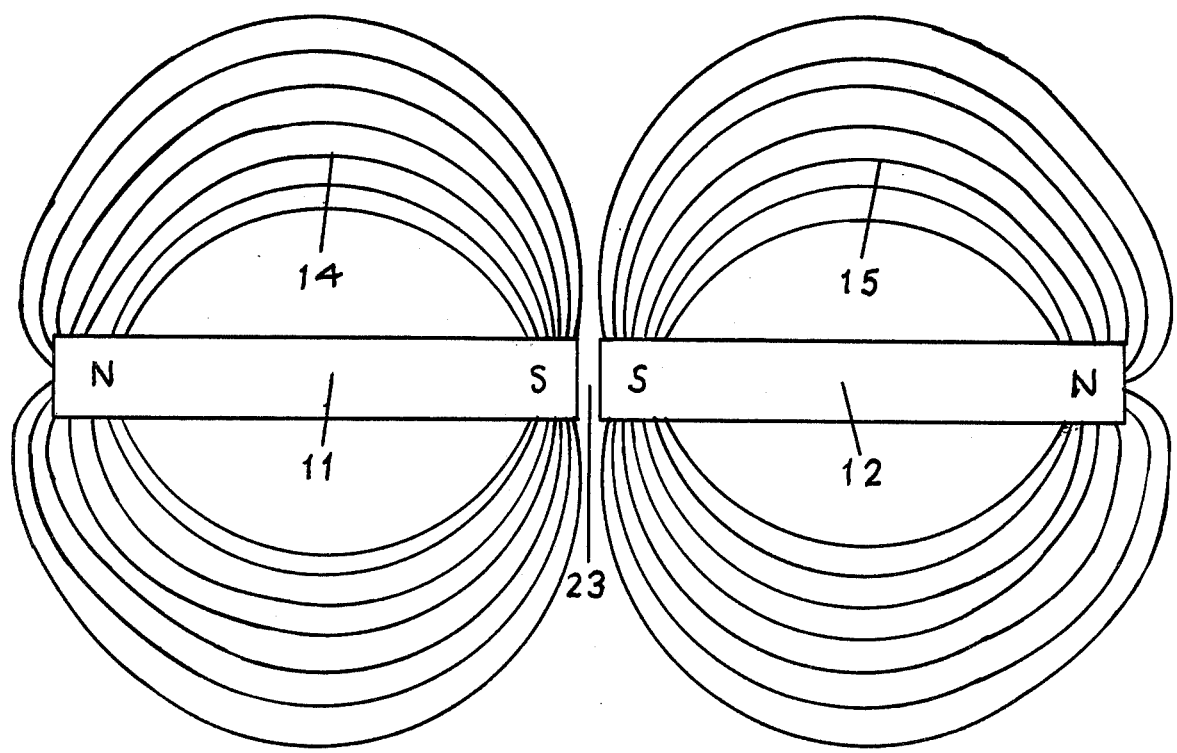
FIG. 7

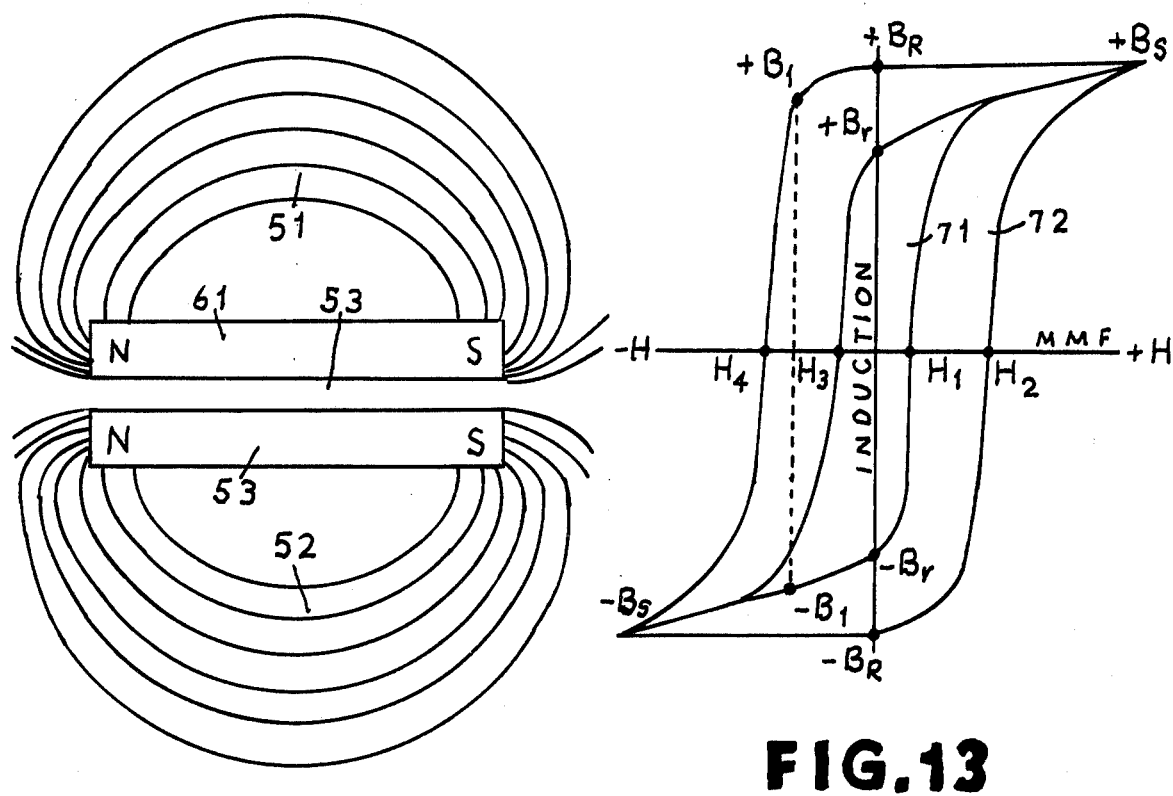
FIG.12
FIG.13
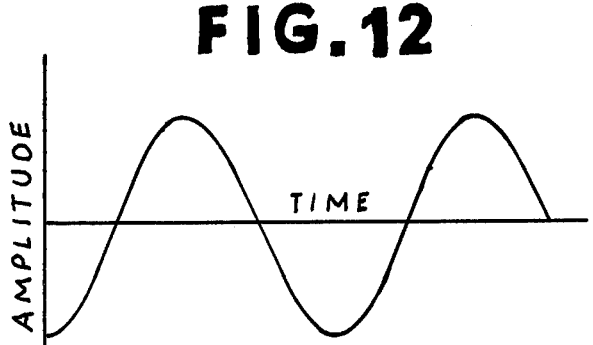
FIG.16
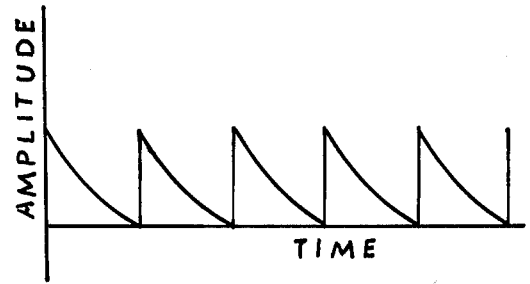
FIG.17
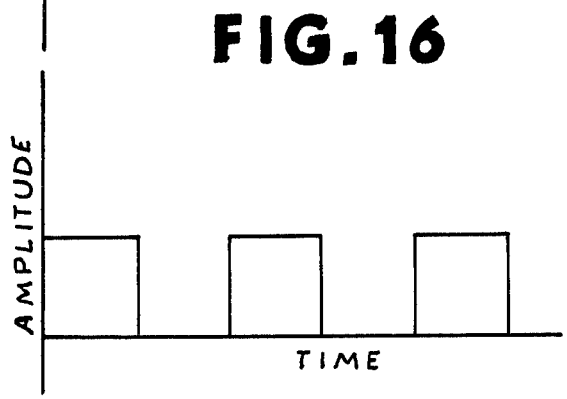
FIG.18
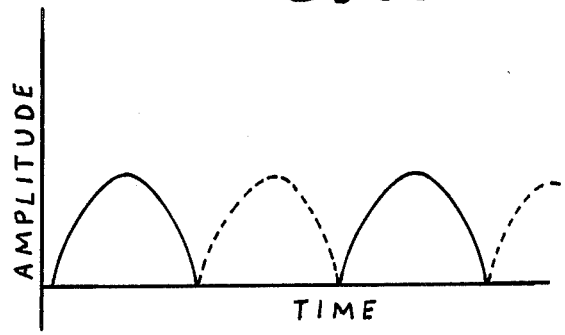
FIG.19

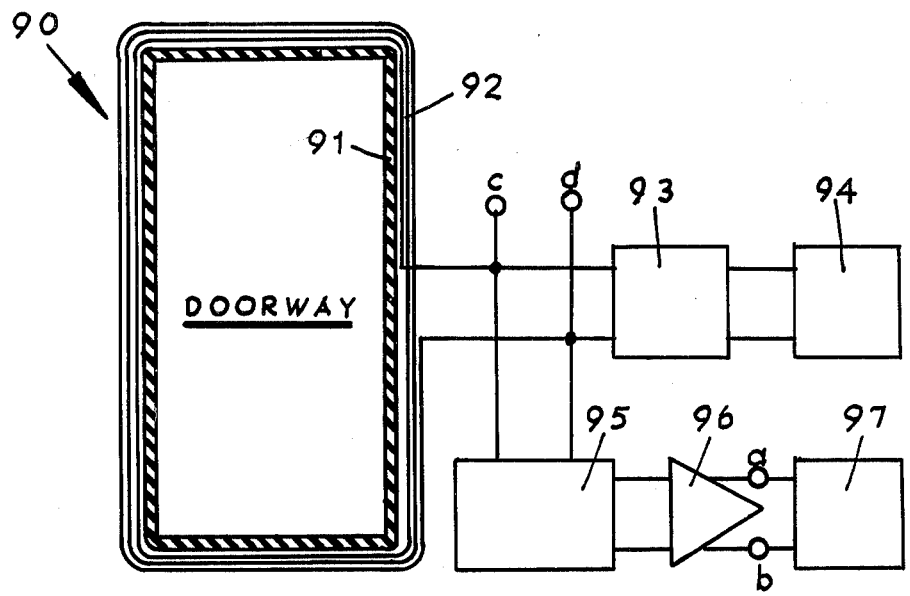
FIG. 15
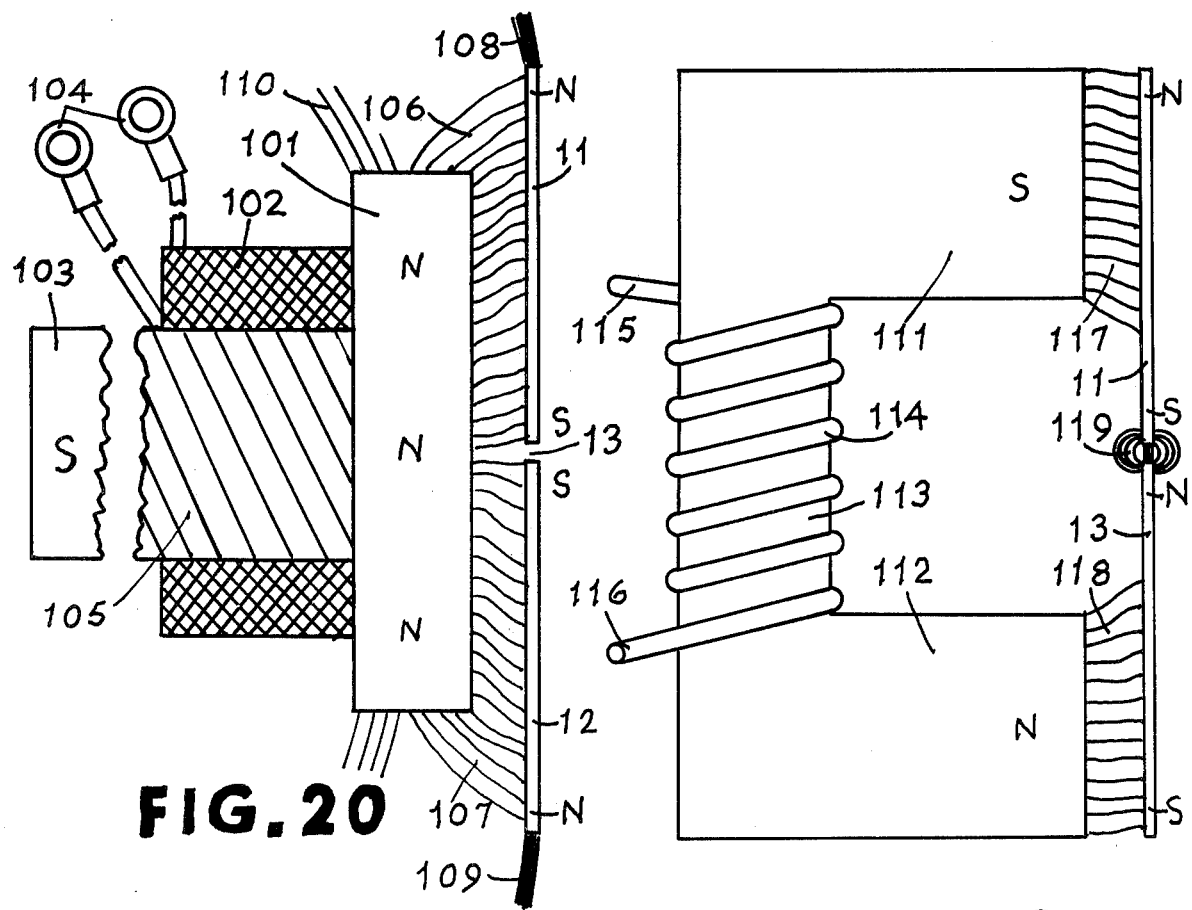
FIG. 20
FIG. 21

FERROMAGNETIC MARKER PAIRS FOR DETECTING OBJECTS HAVING MARKER SECURED THERETO, AND METHOD AND SYSTEM FOR ACTIVATING, DEACTIVATING AND USING SAME

FIELD OF THE INVENTION

The invention relates to a marker and a method of using the marker in a system for detecting the marker, and the activity state of the marker to prevent unauthorized removal of objects having the marker attached thereto, or internally contained.

DESCRIPTION OF THE PRIOR ART

There are in existence several systems for detecting or preventing the theft of articles of value. One of these described in U.S. Pat. No. 3,754,226, granted to E. R. Fearon, Aug. 21, 1973 entitled "Open-Strip Ferromagnetic Marker And System For Using Same," describes an improved marker and system. This marker, when secured to an object, enables detection of the presence of the object when the object is in an interrogation zone, such as a doorway, when the zone has a magnetic field varying at a pre-determined fundamental frequency. This marker utilizes an elongated ferromagnetic marker of low coercivity capable of generating a detectable signal containing harmonics of the fundamental frequency when placed in the zone. An improvement to this invention described in U.S. Pat. No. 3,747,086, granted to Glen Peterson, July 17, 1973, entitled "Deactivatable Ferromagnetic Marker For Detection Of Objects Having Marker Secured Thereto And Method And System Of Using Same," adds an element of high coercivity to the element of low coercivity whereby the magnetized, or unmagnetized, state of the high coercivity element controls the ability of the low coercivity element to generate and radiate harmonics of the interrogating signal. This improvement makes it possible to determine, with considerable precision, whether or not the goods being passed, or carried, through the interrogation zone are being properly removed or whether the passage is illicit.

A somewhat earlier system for detecting or preventing the theft of articles corresponds with U.S. Pat. No. 3,292,080, granted to E. M. Trikilis, Dec. 13, 1966, makes use of a magnetometer in the interrogation zone and utilizes a magnetized object which identifies the article unless check out procedure has removed the magnetism from the object.

French Pat. No. 763,681, issued to Pierre Arthur Picard, discloses a remote detection system which employs dynamic magnetic phenoment to detect the presence of an object. The system of Picard, which is fundamental to most of the useful ferromagnetic systems presently in use, is based upon the discovery that a piece of metal subjected to a sinusoidally varied magnetic field produces in a pair of balanced pickup coils in the vicinity of the applied field an induced voltage characteristic of the metal. The Picard patent discloses that high permeability metals produce an induced voltage including high order harmonics of the sinusoidal field.

Additionally, in the area of ferromagnetic markers, the patent issued to Robert E. Fearon Dec. 22, 1971, U.S. Pat. No. 3,631,442; the patent issued to James T. Elder and Donald A. Wright May 23, 1972, U.S. Pat. No. 3,665,449; and the patent issued to James T. Elder Oct. 9, 1973, U.S. Pat. No. 3,765,007 make use of some of the foregoing and related phenomena.

All of the foregoing systems have severe difficulties of one kind or another. The Trikilis system requires a rather large piece of ferromagnetic material for the marking of the merchandise, otherwise ambient variations in the magnetic field are greater than the changes caused by the Trikilis marker. The Picard system does not provide a means of deactivating the marker, nor does it provide a means of sufficient sensitivity to uniquely identify particular marker construction as opposed to other ferromagnetic materials. While the combined systems of E. R. Fearon and Glen Peterson, above referenced, together provide great sensitivity and a means of deactivating the marker, experience shows that additional sensitivity would be useful, and the deactivation means is one a half-way measure; e.g., it depends upon whether or not one or more of the elements of the marker are magnetized or demagnetized. Similar defects can be found in the methods used by J. T. Elder and Donald A. Wright.

SUMMARY OF THE INVENTION

The most definite states of a piece of ferromagnetic material are not those pertaining to whether it is magnetized or demagnetized. The magnetized state is quite certain but the demagnetized state is variable and uncertain because it is the nature of all ferromagnetic materials to become magnetized to one degree or another, and this ability is greatly influenced by such variables as ambient temperature, position in the earth's magnetic field, and the nature of neighboring objects. Computer memories, for example, do not rely on the magnetized and de-magnetized states to provide the 0,1 of bit storage: the de-magnetized state is far too uncertain. Accordingly, computer bit storage is based upon the two saturated conditions of the hysteresis loop of any piece of suitable ferromagnetic material. A "0" is when the material is flipped in an arbitrarily chosen saturated condition, and a "1" is when the material is flipped into the opposite saturated condition.

It is fortunate for computers that conductors can be used to thread memory cores and thereby provide a sense of direction; alternatively, the direction of rotation of disc, drum and film ferromagnetic memories can be used to provide the sense. No such simple means is, however, available to the methods and means of anti-pilferage systems. Since, for obvious reasons, non-contact systems are greatly preferred, we can't use wires to determine the sense of magnetism in a marker, and since a package which has a magnetic marker inside can be carried through the door of an interrogation zone in any direction and orientation that pleases the customer, the direction of motion of the package to determine "sense" is not available either.

Despite these obstacles, the precision of control offered by the two magnetized states of ferromagnetic materials, as compared with the mere magnetized and de-magnetized states, makes it highly desirable to find and provide methods and means whereby the two magnetized states might be used to determine the status of packages of goods. Such provision is the entire object and purpose of this invention.

The magnetic markers are provided in pairs, and in the preferred embodiments of the invention, the two members of each pair are made as identical in size, shape, weight and material composition as it is possible to make them. In every instance of application, both members of a pair are magnetized and the two states are determined by whether the pair members are magnetized "aiding" or "opposing" each other. In an interrogation zone where both static and dynamic fields can be made available, the response of the markers will be quite different when magnetized in opposition than what it is when the markers are magnetized to aid each other. Moreover, as will be shown, the conditions of opposition and aiding of the marker pairs can be switched at two or more stages of any check-out system, by the method and means of this invention, and in this way the licit and illicit movement of goods determined with great precision.

BRIEF DESCRIPTION OF THE DRAWINGS

FIG. 1 shows a geometric arrangement of ferromagnetic marker pair wherein the pair members are magnetized in opposition.

FIG. 2 shows the marker pair of FIG. 1 with the pair members magnetized aiding.

FIG. 3, in three views A, B, and C, shows another geometric arrangement of marker pairs wherein the pair members are magnetized in opposition. FIGS. 3A and 3C are plan views of the arrangement, and FIG. 3B is an edge view.

FIG. 4, with corresponding A, B, and C views, shows the geometric arrangement of FIG. 3 with the parker pair magnetized aiding.

FIG. 5 shows a third geometric arrangement of magnetic marker pairs wherein the pair members are magnetized in opposition.

FIG. 6 shows the marker pair of FIG. 5 with the pair members magnetized aiding.

While many other geometric arrangements of ferromagnetic marker pairs may be possible, the three geometric arrangements illustrated by FIGS. 1 through 6 are the basic arrangements and all others will be derivatives thereof. It is obvious, for example, that the marker pairs instead of being in straight-line, plane relationships can be arranged at angles with each other if any justifiable reasons can be found for such arrangements. The illustrations here provided are considered all that are necessary to adequately define the invention.

FIG. 7 is a drawing showing the magnetic field produced by the marker pair of FIG. 1.

Figure 8:
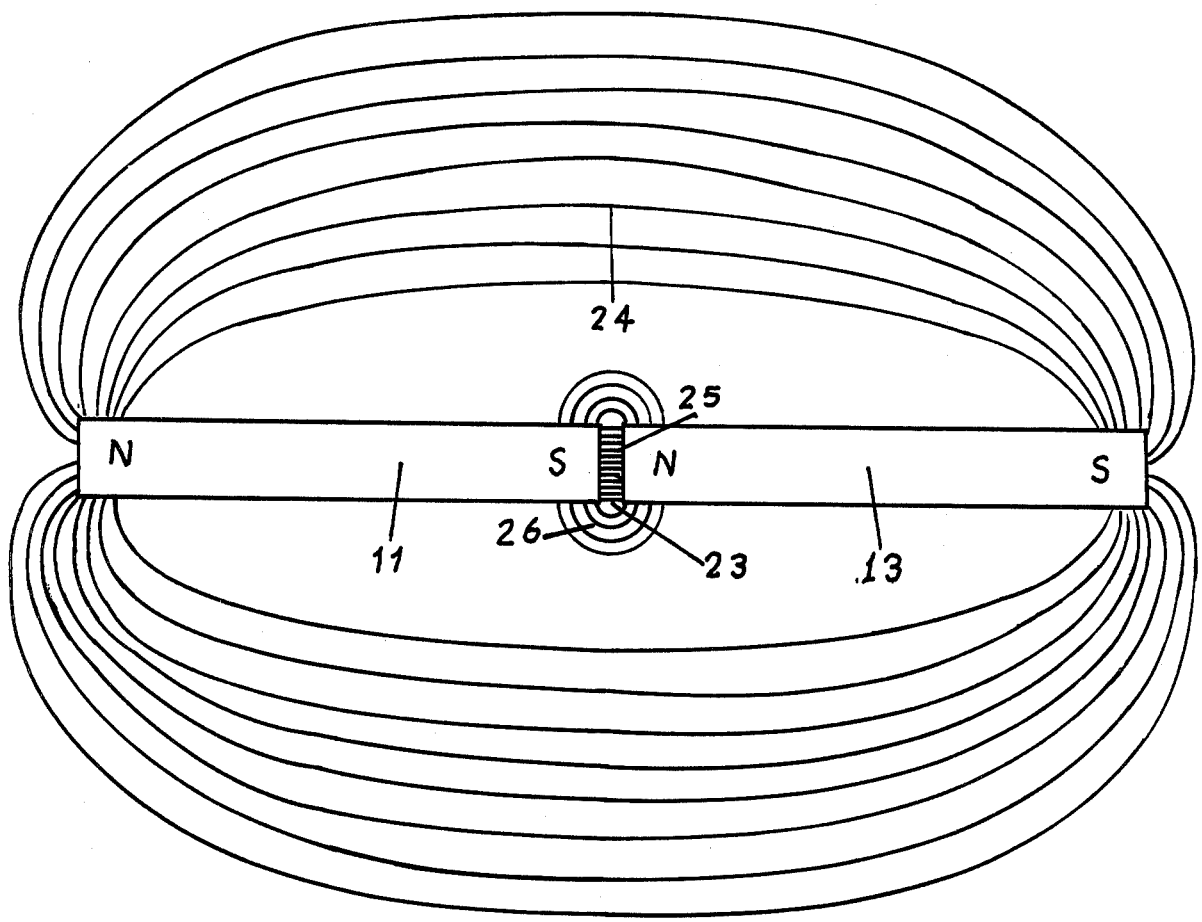

FIG. 8 is a drawing showing the magnetic field produced by the marker pair of FIG. 2.

Figure 9:
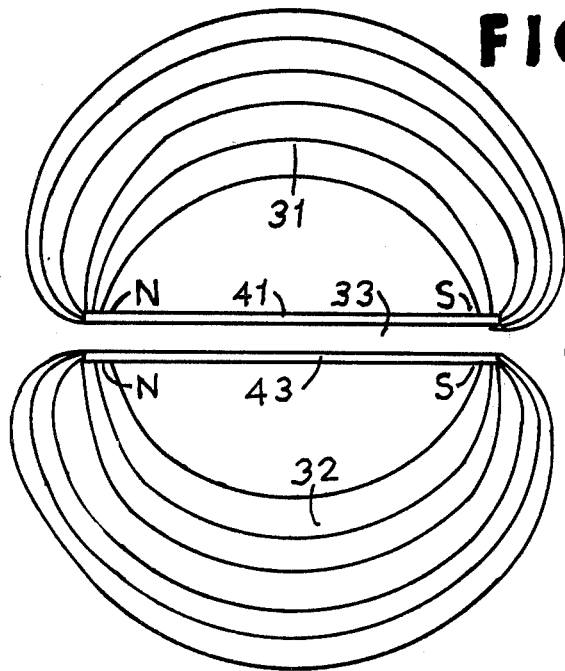

FIG. 9 is a drawing showing the magnetic field produced by the marker pair of FIG. 3.

FIG. 10 is a drawing showing the magnetic field produced by the marker pair of FIG. 4.

Figure 11:
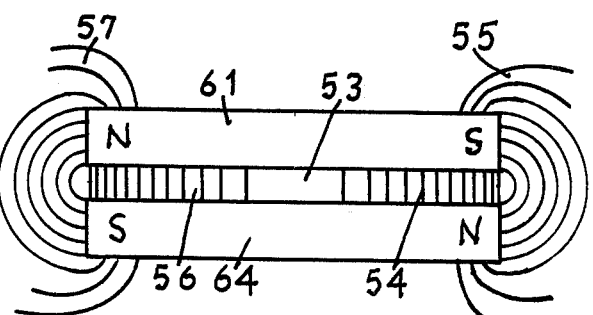

FIG. 11 is a drawing showing the magnetic field produced by the marker pair of FIG. 6.

FIG. 12 is a drawing showing the magnetic field produced by the marker pair of FIG. 5.

FIG. 13 shows typical hysteresis loops of possible ferromagnetic marker pairs, whereby some of the magnetic fundamentals are explained.

Figure 14:
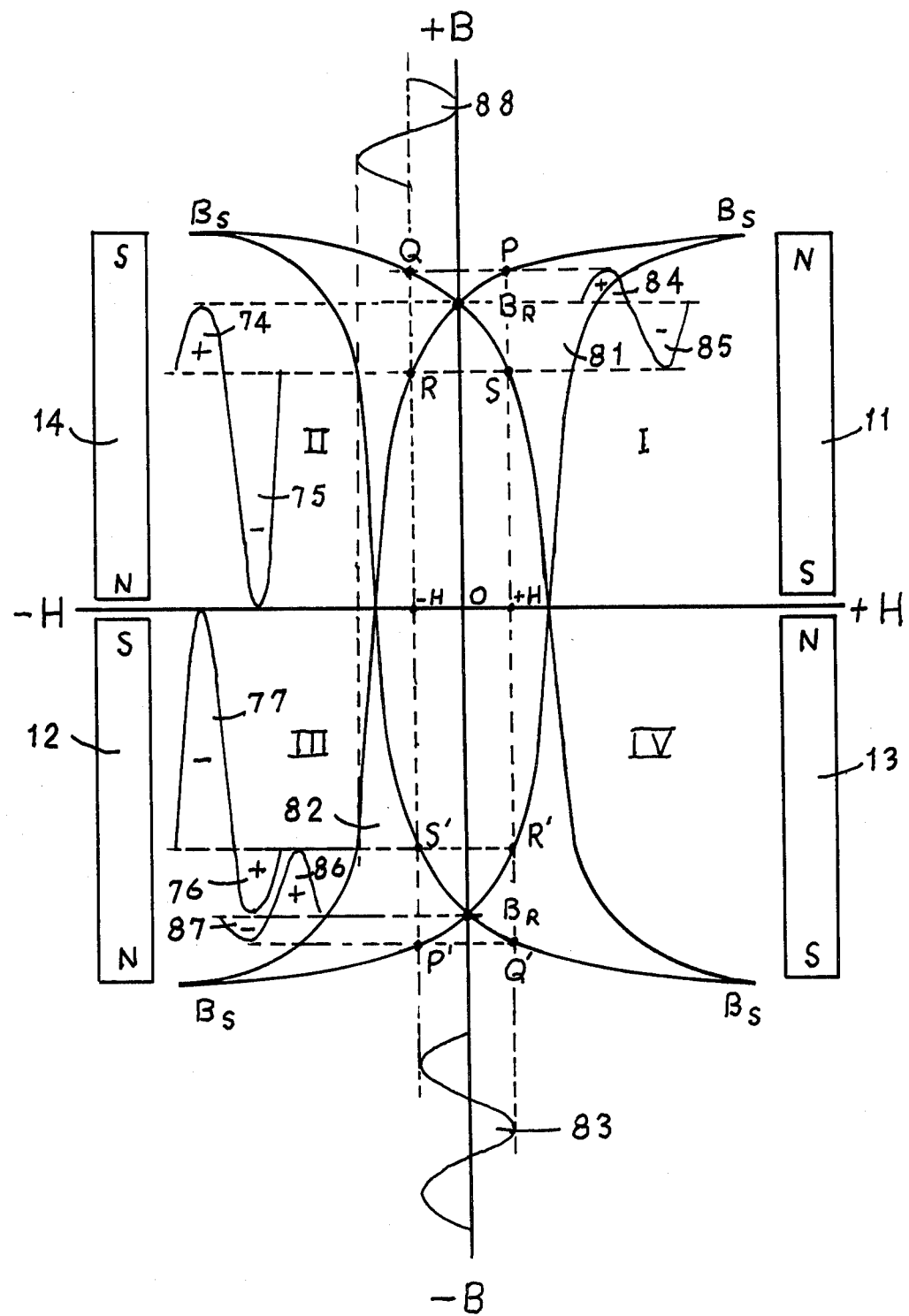

FIG. 14 is a composite diagram of four hysteresis loops whereby the operation of the present invention is further explained.

FIG. 15 is a diagram showing the functional arrangement of the system in the interrogation zone.

FIGS. 16, 17, 18 and 19 are graphs of some of the wave forms that can be used in practicing the invention.

FIG. 20 is a drawing, in partial cross-section, showing the means provided to magnetize the marker pair of FIG. 1.

FIG. 21 is a drawing showing the means provided to magnetize the marker pair of FIG. 2, or flip the pair of FIG. 1 to the magnetized state of FIG. 2.

Figures 22, 23:
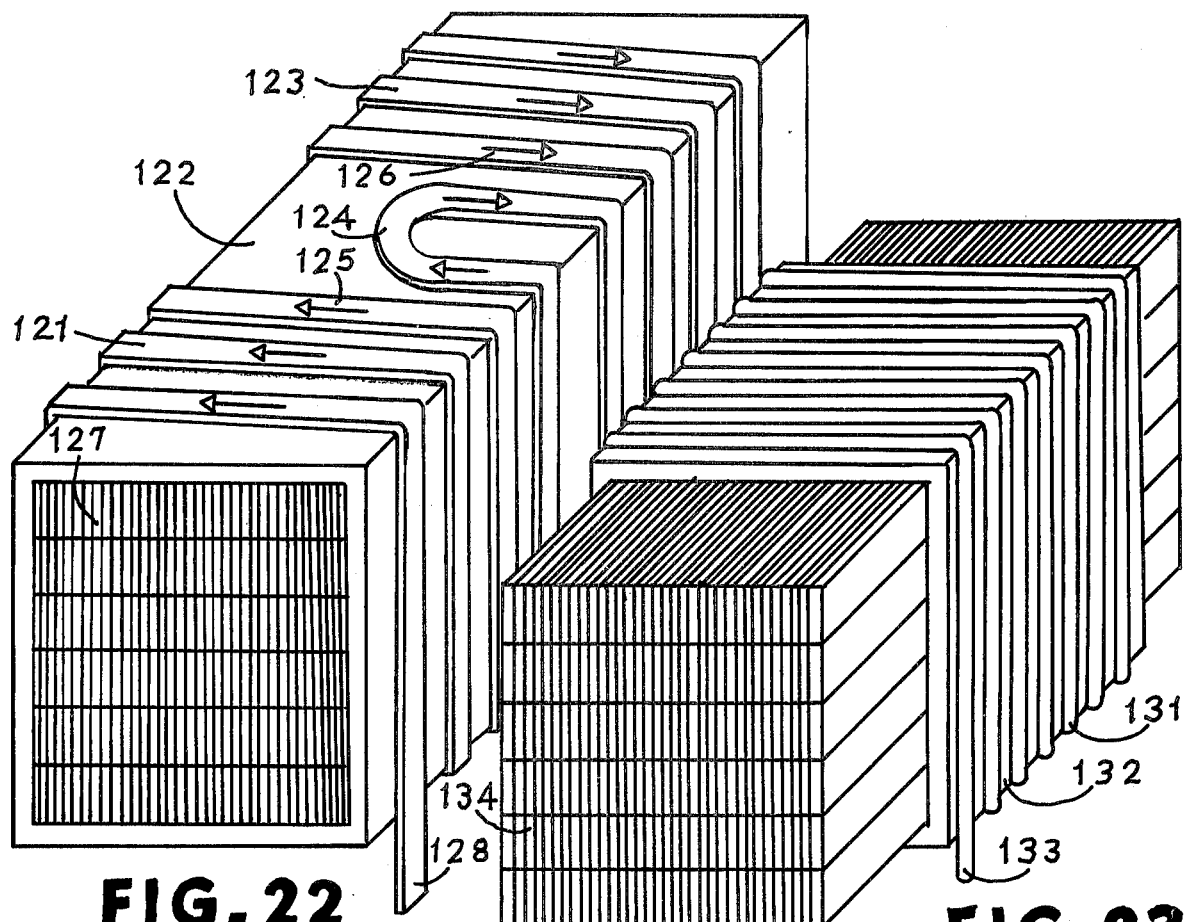

FIG. 22 is a drawing in perspective view showing an alternative means provided to magnetize marker pairs having the geometry of FIG. 1, that is also adapted to the mass production of such marker pairs.

FIG. 23 is a drawing in perspective view showing an alternative means provided to magnetize marker pairs of the configuration of FIG. 2.

Figure 24:
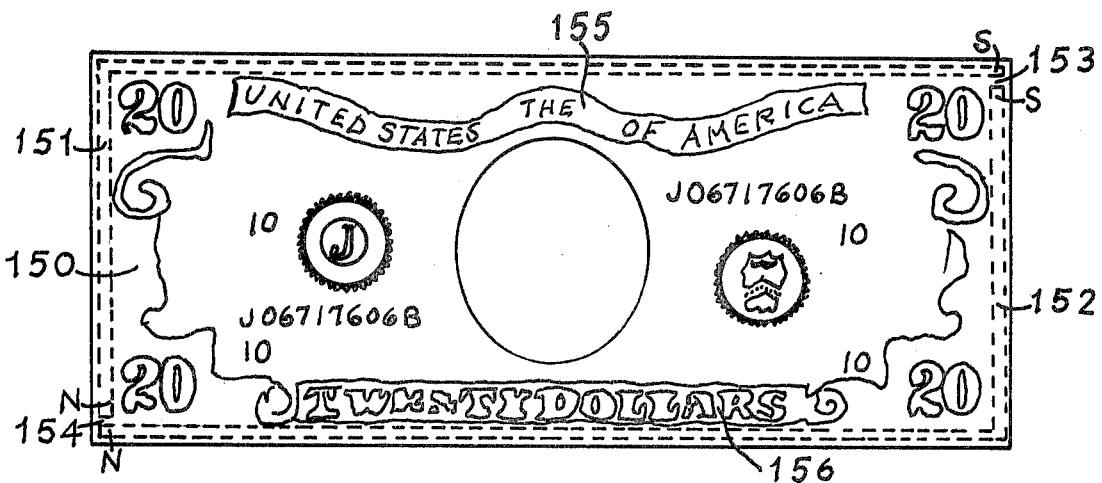

FIG. 24 is a drawing in plan view showing the application of the invention to currency.

Figure 25:
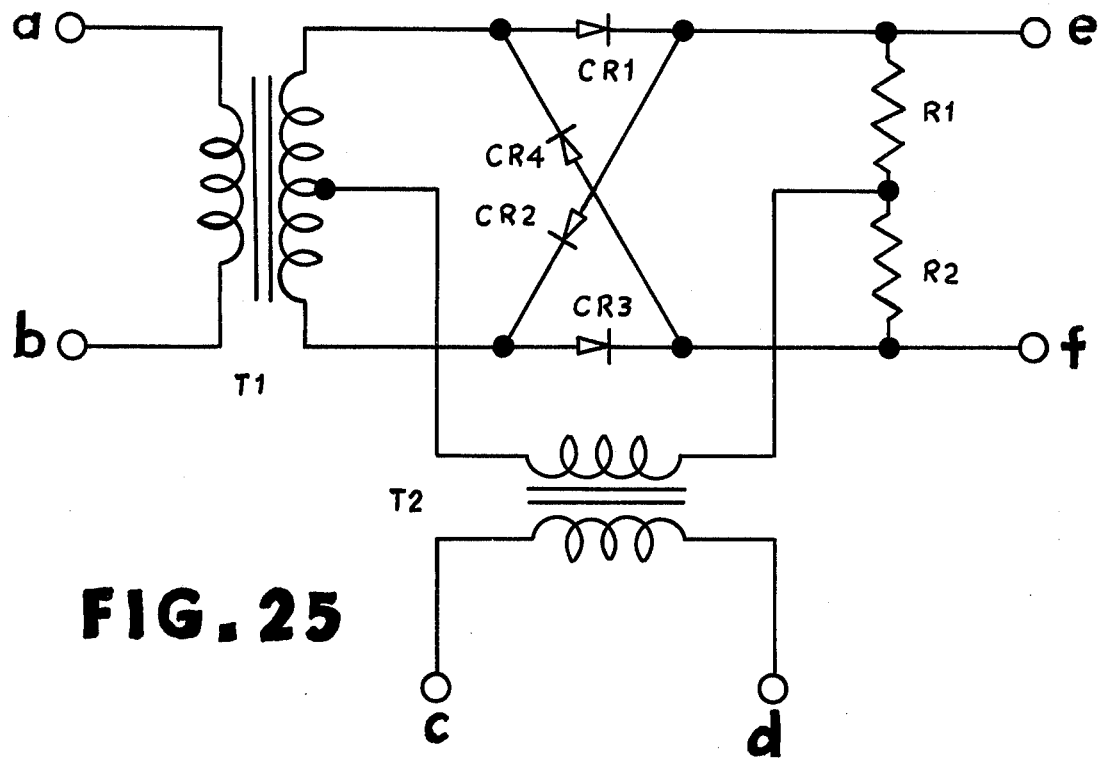

FIG. 25 is a schematic circuit diagram showing the preferred form of wave detector used in the analysis of wave shapes in the practice of this invention.

Figure 26:
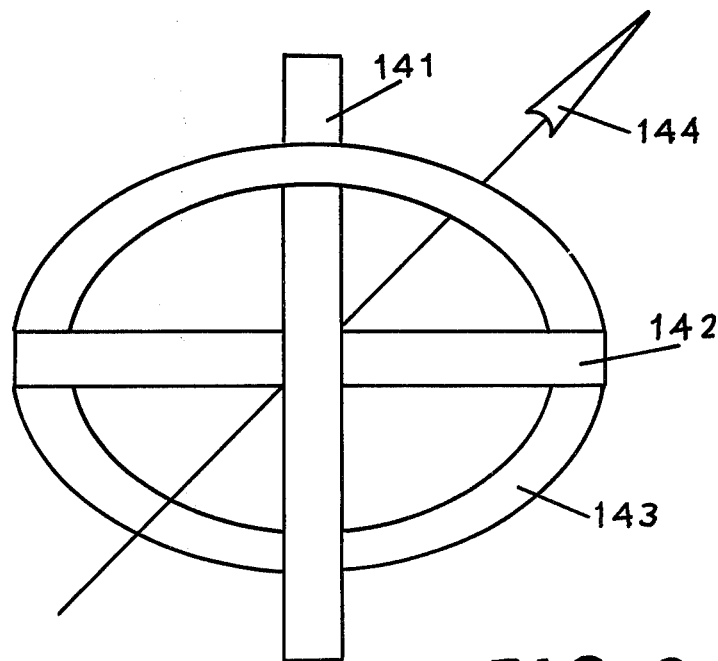

FIG. 26 is a drawing in perspective view showing a preferred form of status-determining, or pair switching coils, used in the system of this invention.

DETAILED DESCRIPTION OF PREFERRED EMBODIMENTS

I now turn to FIGS. 1 and 2 where a preferred form of ferromagnetic marker is shown. 11 and 12 are two identical pieces of suitable ferromagnetic material which preferably are thin, narrow and long. They are held in position by a suitable non-magnetic body 20, to which they are attached, or in which they are inbedded, and this body can be made from plastic, paper, wood, aluminum, stainless steel, etc. 23 indicates a suitable gap between the adjacent ends of the two strips 11 and 12. initially, the marker is magnetized in the state shown by FIG. 1 with the fields opposing each other as illustrated in FIG. 7. Following payment for, and/or check-out of, the item of goods to which the marker is attached, the goods, with marker attached, is passed through the field of a magnetic system, such as those of FIGS. 21 or 23, and the magnetization of strip 12, FIG. 1, changed to that shown as 13, FIG. 2. The two strips are now magnetized as aiding each other, and since gap 23 is short compared with the length of either 11 or 13, the two strips will act essentially as if they were one long magnet having a field as shown by FIG. 8. In using the apparatus of FIGS. 21 or 23 to flip the magnetization of strip 12 to that of strip 13, it should be noted that a short uni-directional pulse of current is put through coils 114 or 131 in such direction as to drive 11 further into saturation of the polarity shown which direction will flip 12 over into the magnetization of 13, as already stated. The switching apparatus which energizes the magnetizing/demagnetizing coils 114 or 131 will have a suitably rapid turn-on-turn-off characteristic such that the slug of current is not given time to reverse direction, or oscillate, as such currents in coils often want to do. The art of magnet chargers is well developed in this area of action and big fast-switching transistors or SCR's are usually employed for this purpose today. Alternatively, the magnet charging apparatus of U.S. Pat. No. 3,390,310, issued to Glen Peterson June 5, 1968, may be employed.

The responses of the markers of FIG. 1 and FIG. 2, when placed in an interrogation field, or door, such as represented by FIG. 15, will be vastly different. For example, if the interrogation field is a sinusoidal field of fundamental frequency, f, the response of the marker of FIG. 1 will be rich in even-ordered harmonics $2f, 4f, 6f,$ etc., while the response of the marker of FIG. 2 will be rich in odd-numbered harmonics $3f, 5f, 7f,$ etc. What is more, if the strips are carried length-wise through the interrogation field, or have a sufficiently large component aligned with the axis of the interrogation field, the even-numbered harmonic response of the marker of FIG. 1 will first increase exponentially as the field is approached from a distance, will then begin to decrease as the marker enters the door, will fall rapidly to zero when the marker is exactly centered in the field, will then build to a peak as the marker leaves the doorway on the other side, and thereafter fall off exponentially. Furthermore, the phase of the harmonic response will change at the center of the doorway so that if the signal is analyzed by the coherent detector of FIG. 25, the polarity of the voltage pulse across terminals e and f will reverse at the center of the doorway. On one side of the doorway, the voltage across terminals e and f will be positive while on the other side of the doorway the voltage will be negative. Again, if the marker strips 11 and 12 are made identical to a high degree, the detection system can be tuned to a high degree of balance and given great sensitivity. Thus, the presence of the markers, and the customer carrying the goods containing the marker can be made known a sufficient distance from the doorway to alert personnel. With appropriate arrangements, as interrogation coils hidden in the floor, goods cases, and other non-obvious locations, customers could be suitably monitored over an entire area.

No such response issues from the marker configuration of FIG. 2, as issues from FIG. 1 marker configuration. As already noted, the response of the FIG. 2 marker will predominately be fundamental and odd harmonics; furthermore, the response, as the marker moves through an interrogation zone, will build up to a single maximum at the center of the door and fall off exponentially on either side without a change of phase. Thus, the two markers can be identified, not only by their harmonics, but also by the manner of signal build up and decay.

One excellent application of this invention, not hitherto used, is to paper money or currency. It is proposed to tag paper money after the manner of FIGS. 1 and 2 so that in a bank, cash register, safe, or armoured truck, the currency would be put in the condition of FIG. 1, or vice-versa, while in general circulation it would be put in the condition of FIG. 2, or vice-versa. While hold-up bandits and burglars could equip themselves with the apparatus of FIGS. 20 through 23, they would scarcely have an opportunity to use it inside a bank or store. While robbers could bring metal boxes with them in which to put the currency so as to shield it from the interrogation field, such metal boxes are the easiest thing in the world to find by an interrogating field; as a matter of fact, we go to considerable trouble to avoid detecting such things. Accordingly, and regardless of what bank or store employees did, or didn't do, regardless of what the hold-up artists did, or didn't do, a burglar alarm could be sounded. The markers in paper money could be in the form of strips as shown in FIGS. 1 and 2, or they could be made part of the pattern of the money itself.

Before passing to the other geometric arrangements of the ferromagnetic marker strips of this invention, it should be noted that as long as the two strips of a pair are as identical as it is possible to make them, neither is capable of demagnetizing the other or even of appreciably altering the character of the magnetization thereof. Both must remain in the condition they are put by apparatus external to them.

FIGS. 3 and 4 show an arrangement of ferromagnetic marker strips wherein the strips 41, 43 and 44 are placed overlaying each other inside, or on the surfaces of, a nonmagnetic body 30, and with a suitable space, or gap, 33, between them. Again, the only difference between strips 43 and 44 is the direction of magnetization. FIGS. 3A, 3C, 4A and 4C are plan views of the arrangement, while FIGS. 3B and 4B are edge views. The pair of FIG. 3 is magnetized in opposition and will produce the magnetic field pattern of FIG. 9, while the pair of FIG. 4 is magnetized aiding. The magnetization pattern of FIG. 23 can be readily accomplished by placing the tags inside a coil, such as that of FIG. 23, while the pattern of FIG. 4 can be obtained by bringing each tag against the poles of a charger, such as FIG. 22. When this is done, the marker closest to the poles of the charger will act as principal while the marker furthest from the poles of the charger will serve as keeper. If both members of the pair are ferromagnetically identical, they will, following relaxation from the charging pulse, align themselves as shown by FIG. 4 to give essentially no external magnetic field as each keepers the other.

When placed in an interrogation field, the configuration of FIG. 3 will respond essentially as if a single magnet was present; i.e., produce the fundamental and odd harmonics predominately. The configuration of FIG. 4, on the other hand, will be essentially clamped magnetically and will not readily give rise to harmonics of any kind: it becomes a magnetic system that is closed to external influences - at least to the extent that the magnetization prevails. In this sense, this marker responds in the same way that my marker does in U.S. Pat. No. 3,747,086 when the member of high coercivity is magnetized and clamps the member of low coercivity. The only difference here is that the two members of the pair are identical and will hold each other clamped at, or near, the opposing points $\pm B_R$ of remanent magnetization; whereas, in U.S. Pat. No. 3,747,086 the high coercivity member will have fallen beyond $B_R$ to some lower de-magnetization point on the hysteresis loop, as $+B_1$, FIG. 13, while the low-coercivity member will be held at $-B_1$, near $B_{sat}$ for the low coercivity member.

FIGS. 5 and 6 show a side-by-side placement of ferromagnetic pair members 61, 63, and 64. 50 is the nonmagnetic material which holds the strips in position with a gap, 53, separating them. Again, the only difference between strips 63 and 64 is the direction of magnetization with respect to 61. The N, for north pole, and S, for south pole, of these strips, as well as all previous ones, indicated how the strips are magnetically polarized. Obviously, pairs in FIGS. 1 through 6 can be polarized oppositely to the ways illustrated without departing from the essence of this invention, as: S - N, N - S, with respect to FIG. 1; and S-N, S-N eith respect to FIG. 2., etc.

The field patterns of the markers of FIGS. 5 and 6 are given in FIGS. 11 and 12. Depending upon the width of the gap 53, the marker of FIG. 5 will act as if it were a single magnet, or composed of two separated magnets, and this, in turn, will determine the nature and content of the harmonics radiated.

Referring again to FIG. 7, the separated field patterns comprised of flux lines 14 and 15 indicate the nature and extent to which the strips 11 and 12 are susceptable to the magnetic field in the interrogation zone and the re-radiation of energy picked up therein. There are, of course, no flux lines in the gap 23 as the two S-poles repel each other. This repelling force keeps the strips trapped at points R and R', FIG. 14, at magnetizations slightly less than $B_R$, the strips forming an open magnetic system. If point R of strip 11, for example, tries to move down the hysteresis loop toward some lower value of flux density and higher MMF, the repelling force of strip 12, at R' will push it back where it belongs. On the other hand, if R tries to move up the hysteresis loop, it would have to gain some energy from somewhere to be able to do this. And if it did somehow gain the necessary energy, the new point would be unstable because there is only one pair of points on the two demagnetization curves, considering leakages and all other magnetic phenomena, where the two strips can rest in harmony. Accordingly, if one strip or the other momentarily gains energy and rises to a different point than where the two strips are in equilibrium, it would be obliged to radiate this energy and fall back to the stable position.

Similarly, referring to FIGS. 8, 24 and 25 and 26 point to the flux lines of the field of this system of magnets. The flux lines 25 and 26, across the gap 23, are entirely enclosed and shielded by the external flux lines 24, and this pattern of flux lines describes the susceptibility of this magnetic system to external influences such as those of an interrogation zone. However altered momentarily by the external field, this pattern of flux lines represents the ground state to which the magnetic system must return, all energy different from this which has been received and momentarily stored having to be re-radiated.

FIG. 9 shows the magnetic pattern of the strip configuration of FIG. 3, as previously stated. The strips 41 and 43 being held in opposition, there is no flux in the gap 33, and the external flux is indicated by lines 31 and 32. Also, as previously noted, this field pattern is essentially that of a single magnet when the gap 33 is small compared with the other dimensions of the system. The susceptibility of the system to external influences, the energy momentarily absorbed and re-radiated, will be measured by this field.

FIG. 10 shows this same system of ferromagnetic strips when one of the strips, 43, has been flipped to the opposite polarity and becomes strip 44. Polarized in this manner, all of the flux, except the little bits of fringing flux at the ends, 35 and 37, flows in the gap 33 as indicated by the flux lines 34 and 36. Such a system, having essentially no external field, is, by reciprocity, closed also to external influences. As I described it previously, the system is "clamped" being unable to receive energy from outside, or reradiate energy had it somehow received any. It is essentially a closed-core system, and for it to receive and radiate energy, a conductor would have to thread the gap 33 and close on itself.

FIGS. 11 and 12 show the magnetic field patterns of the systems of strips of FIGS. 6 and 5, respectively, also as previously noted. When the gap 53 is small compared with other dimensions, the strips 61 and 63 act as if they formed a single magnet and the flux lines flow accordingly, with no flux in the gap. When the gap 53 gets large, however, the field pattern becomes more like a figure-of-eight and there will be some lengthwise flux in the gap flowing between the poles of each strip but none crosswise. Similarly, when strip 63 is flipped magnetically to become strip 64, most of the flux will flow across gap 53 as indicated by the flux lines 54 and 56, but due to the pole width there will be more lines of fringing flux, 55 and 57, than in FIG. 10. And as the gap 53 is increased relatively to other dimensions, the fringing flux will increase and spread out. Magnetic configurations of FIG. 6, as described by the flux pattern of FIG. 12, is less clamped than is the configuration of FIG. 4, which is described by the field pattern of FIG. 10. Accordingly, the configuration of FIG. 12 will be more susceptable to external fields, will be able to receive more energy from external fields and hence will re-radiable a pattern of identifiable harmonics.

Which of the three basic magnetic strip configurations is preferred will depend upon the problem. It would off-hand appear that the configuration of FIGS. 1 and 2 would be most applicable to tagging books in a library while the configuration of FIGS. 5 and 6 would be best suited to tagging articles of clothing.

We turn now to some general considerations applicable to all strip configurations and the magnetic systems formed thereby. First, let us consider the magnetic system formed by strips of ferromagnetic material having different hysteresis loops, as 71 and 72, FIG. 13. The magnetically harder material having coercive force $H_4$, is described by loop 72, and the magnetically softer material, having coercive force $H_3$, is described by loop 71. If each strip is completely isolated from the other, formed in a ring to close on itself so that such represents a closed magnetic system, and we applied a pulse of MMF sufficient to drive each into magnetic saturation at $B_S$ and $B_s$, respectively; once the pulse of MMF is removed, the magnetization in 71 will fall back to a flux value of $B_r$ on the ordinate where H is zero, and the magnetization in 72 will fall back to $B_R$. If both strips represented perfectly open magnetic systems (an impossibility since any strip, however short, has some length), the magnetization would fall to zero flux at points $H_3$ and $H_4$, respectively. Since this is impossible, the magnetization in 71 will fall to some point between $H_3$ and $B_r$, and that in 72 to some point between $H_4$ and $B_R$, and the longer the strips the higher up on the curves will the points be. If infinitely long, the flux would fall only to $B_r$ and $B_R$, respectively, the points of retentivity. The positions $H_3$, $H_4$, $B_r$, and $B_R$, or any points therebetween, are maintained by magnetic domain orientation in the strips, called permanent magnetism. If this orientation is sufficiently strong to resist all demagnetizing forces, including thermal agitation, magnetization in the strips will remain where it landed indefinitely.

With two unlike strips of ferromagnetic material, separated but in magnetic contact, the performance is a little different. An applied MMF raises both strips to saturation at $B_s$ and $B_S$, respectively. With the MMF released, the 71 material falls back along the demagnetization part of the hysteresis loop, through $B_r$, and would stop somewhere between $B_r$ and $H_3$ if 72 wasn't riding its back. The 72 material also falls back along its demagnetization curve through $B_R$ and $+B_1$, and, too, would stop somewhere between $B_1$ and $H_4$ if 71 wasn't present to serve as a keeper. The result is, the 72 material having a prevailing coercive force, drives the weaker 71 material clear down into the third quadrant to $-B_1$ where it adjusts to a flux value equal to $+B_1$ in magnitude but of opposite direction of flow. This is how my deactivatable ferromagnetic marker of U.S. Pat. No. 3,747,086 operates when the marker is deactivated. When the marker is activated, the 72 material is demagnetized under well-known alternating current technics, and the 71 material freed to respond to the alternating fields of the interrogation zone.

With two identical strips of ferromagnetic material, separated by a gap but otherwise in magnetic contact, the performance is quite different yet. To explain the operation of this arrangement we are obliged to refer to FIG. 14 where two identical hysteresis loops, 81 and 82 are displayed. Normally, 82 would be the lower half of 81, and 81 would be the upper half of 82. Think of the two curves as separated and applying to two separated strips of identical ferromagnetic material. With a pulse of positive MMF simultaneously applied, strip 11 is driven into saturation at $+B_S$, and strip 12 is driven into saturation at $-B_S$ with a similar pulse of negative MMF. With the MMF's removed, strip 11 relaxes and falls back along its demagnetization curve, through P, $+B_R$ and R, etc.,; 12 relaxes and falls back along its demagnetization curve, through P', $-B_R$, and R', etc. The demagnetization of each strip will stop at some points such as R and R' where the coercive forces, $+H$ and $-H$, are equal and opposite. The operating line of this system, therefor, is along the line ROR' through the origin. If the material used in strips 11 and 12 is properly selected, and the two strips cut as identically as we can make them, they will be unable to demagnetize each other and will simply operate in offset positions as illustrated.

When situated in an interrogation zone and driven by an alternating mmf, such as 83 in FIG. 14, strip 11 will be driven to P on the positive half cycles, and to R on the negative half cycles producing the wave of flux 84, 85 in 11 and surrounding area. Strip 12 will be driven to R' on the positive half cycles, and to P' on the negative half cycles. If the two strips 11 and 12 are symmetrically situated in the integration zone, as in the center of the doorway loop, FIG. 15, the positive half cycle response, 84, of strip 11, will be cancelled by the negative half-cycle response, 87, of strip 12, and the negative half cycle responses, 85, of 11, by the positive half cycle responses, 86, of 12, and the harmonic pickup will go through a null, as already described. When, however, the strips 11 and 12 are not symmetrically situated in the interrogation zone, as on either side of the doorway, an even-ordered harmonic signal will be produced, also as already described.

The situation when strips 11 and 13 are aiding each other can best be described by introducing a left-handed coordinate system for strip 13. The magnetization loops will then appear in quadrants I and IV, respectively, and the de-magnetization loops in quadrants II and III. The strips will then operate along the line RS' with a mutual coercive force $-H$. When an alternating mmf is applied to this configuration of strips in an interrogation zone, the small flux responses 74 and 76, and the large flux responses 75 and 77, will occur on different half cycles of the interrogation zone field, and will not cancel but will predominately produce the fundamental and odd harmonics, also as previously described.

FIG. 15 schematically shows a typical doorway of an interrogation zone and the apparatus associated therewith in the energizing of the door and the detection and amplification of ferromagnetic marker signals that are picked up as a result thereof. 90 is an arrow generally pointing to the interrogation unit, or doorway, which consists of some sort of frame 91 which supports a conducting loop 92 comprised of one or more full turns of wire. The number of loop turns is an insignificant quantity, as far as this invention is concerned, and can be adjusted as required to meet or match other parameters of the system, as input and output impedances. 94 is a signal generator that is capable of originating any desirable waveform, for example, those shown in FIGS 16, 17, 18 and 19. 93 is a suitable power amplifier that is capable of energizing the doorway at any required level. 95 is a signal selection apparatus which may be a tuned harmonic selector or filter, or it may be an electronic selector, or a harmonic ratio device, as required by the selected readout system. 96 is an amplifier which receives the signal processed by 95 and amplifies it to the extent necessary to operate 97 which is the final readout, or alarm sounding, unit of the interrogation apparatus 90.

FIG. 16 shows the applied waveform, a sinusoidal wave form, that is generally used in practicing this invention but under special circumstances other waveforms may also be used; for example, the saw-tooth wave of FIG. 17 which is rich in all harmonics, both odd and even. Or the square wave of FIG. 18, which is rich in odd harmonics, might be used for special purposes. Again, the half-wave rectifier wave shown by the full line segments of FIG. 19, which can be rather easily produced at very high power levels, and which is rich in direct current, fundamental and even harmonics; again, the full-wave rectifier which includes both the full-line and broken line segments of FIG. 19, and which is still richer in direct current and even harmonics. The advantage of the waveforms of FIG. 19 is that a steady magnetic field is superimposed on the varying magnetic field in the interrogation zone which, through bias, would shift the operating points on the hysteresis loops of any of the markers.

FIGS. 20, 21, 22 and 23 are illustrations of the apparatus that can be used in the mass production of the ferromagnetic markers of this invention, or in flipping a marker from one operating state to another at a check-out point. FIG. 20 shows a magnetic charging unit having a N-orth pole 101 in close proximity to the ferromatnetic film marker pair 11, 12, and a remote S-outh pole 103, such that when the marker pair 11, 12 is brought in the vicinity of 101 and a unidirectional pulse of current applied to coil 102, through terminals 104, the marker 11, 12 will be magnetized with the strips in opposition regardless of the state the marker pair previously occupied. The only important requirements with this apparatus are that pole 101 be reasonably long, but not as long as the total length of strips 11 and 12, that pole 103 be short and as far removed from 101 as is reasonable and practical, and that the pulse of current applied to 102 be sufficient to flip either, or both 11 and 12, over in polarity. It should be noted that it is not essential that the marker gap 13 be centered on pole 101, and this gives some latitude in the application of this apparatus. The magnetic flux lines 106 and 107 are shown flowing from 101, the N-orth pole of the charger, into the marker pair, with flux lines 108 and 109 being those which flow out of the ends of the marker pair and ultimately back to the remote S-outh pole 103. 111 points to leakage flux lines which don't pass into the ferromagnetic marker pair 11 and 12 but which flow in space between 101 and 103. 105 is the yoke of the charger which magnetically joins poles 101 and 103, and about which coil 102 is placed.

FIG. 21 illustrates a form of magnetic charging apparatus adapted to setting a marker of the FIG. 1, 2 variety in the condition where the strips 11 and 13 are in series aiding configuration. Both N-orth and s-poles 112 and 111, respectively, are in proximity to the marker pair so that when a unidirectional pulse of current is put through coil 114 by means of coil terminal ends 115 and 116, the marker pair becomes magnetized in series aiding configuration regardless of the state previously occupied. 113 is the yoke of the charger around which coil 114 is wound and which joins poles 111 and 112. 117, 118 and 119 show the lines of magnetic flux which flow during a charging operation.

The apparatus of FIGS. 20 and 21 is well adapted for use in a library. For example, that of FIG. 21 can be used at a check-out desk or stand, where library patrons take-out books, while the apparatus of FIG. 20 can be used by a librarian or other library employee when books are returned to the shelves.

FIG. 22 shows a form of magnetic charging apparatus adapted primarily to the mass production of ferromagnetic markers of the present invention but, as has been mentioned and will be shown, it can also be used in the daily practice of the invention to cover check-out and return procedures. Referring first to FIG. 22, 122 is a form having a rectangular cross-section around which magnetic charging coils 121 and 123 are wound in opposition at the ends of form 122. 124 is a conductor loop at the center of the form where the direction of winding of the coils is reversed. 125 and 126 are arrows indicating the relative directions of current flow in the two coils 121 and 123, respectively. The length of the form 122 is preferably the same as the overall length of the markers so that when placed inside 122 with the marker ends even with the coil form ends the markers are properly positioned within the charging coils for charging in the opposing configuration prior to attachment to goods. This same arrangement, providing it is made large enough, can of course also be used in libraries when books are returned to the shelves. If the book magnetic markers are positioned in known places and positions in books, the book can then also be appropriately positioned within 122 for the charging operation. The charger of FIG. 22 is also well suited for marking magnetically protected currency when it is returned to a bank vault, armoured truck, the cash register or safe of a store. 128 refers to one terminal end of coils 121 and 123, the other terminal end being invisible at the back.

FIG. 23 shows the corresponding coil and form arrangement for the mass charging of magnetic markers in the series aiding configuration. Form 132, similar to 122, has a single coil 131 wound around it so that when current is put through it a simple solenoidal magnetic field is generated. 134 indicates a stack of markers, with ends protruding, placed in the charging coil. With this type of charger, it is not required that the markers be accurately positioned in the coil. This form of charger is also well adapted to library, bank and store use. For example, books, currency, or goods being checked out can be appropriately passed through the coil by an operator, or automatically carried through the coil by a simple conveyor, and a switch triggered at appropriate intervals to put a pulse of current through coil 131. 133 refers to one coil terminal end, a second terminal end being included but not shown.

In all the marker charging apparatus here illustrated, FIGS. 20 through 23, it should be noted that it is preferable to use coils having only a few turns and carrying charging currents of the order of thousands of amperes to produce the momentary magnetic fields that are required. In this way, coil inductances can be minimized and problems of current oscillations very largely avoided. Too, charging times are also reduced to minimum values.

FIG. 24 shows some of the identifiable features of a piece of U.S. currency, 150, together with an arrangement of ferromagnetic marker strips. The latter, 151 and 152, are given L-shapes and placed within the paper forming the currency. 153 and 154 are the two gaps which separate the marker strips of the marker pair. As shown, the marker pair is magnetized with the two L-shaped strips in opposition, and this is the preferred condition in which currency would be kept in a bank as this is the condition that is most susceptable to the production of identifiable signals in a doorway or other form of interrogation zone. When the money is passed out by Tellers, in legitimate operations, it would preferably be put on a small conveyor and carried through reorientation apparatus, similar to that of FIGS. 21 or 23, and the magnetic pattern changed to an aiding configuration. Under this circumstance, if the gaps 153 and 154 are small, 151 and 152 will together nearly form a closed ring and the state of magnetization held near $\pm B_R$, or the points of retentivity, and the harmonic response in an interrogation zone will be typical of that configuration. The aperature of the magnetic reorientation device, used by bank Tellers, would preferably be made so small that only a few pieces of currency could be processed at a time. This would be sufficient to satisfy the normal customer but the time involved to process enough currency to satisfy a theif would be more than he could, or would, tolerate.

The option remaining available to the thief in order to put himself in a position to quickly assemble large bundles of un-re-oriented currency under his control would be to carry a rather large metal box, preferably of steel, in which to put the currency and hence to shield it from the magnetic field of the interrogation zone. But such boxes are the easiest things in this world to detect in an interrogation zone and those of us who are serious inventors go to great trouble avoiding the detection of such things. Accordingly, boxes, or bags, of this type can easily be identified by the pattern of harmonics produced, or not produced; furthermore, signal limits can be set up to sound alarms when prescribed signal amplitudes have been exceeded. Again, a large bundle of currency having the the markers uniformly polarized in opposition would be capable of inducing image magnetic fields in the box and these image fields detected by the field of the interrogation zone, unless the box was excessibely thick and hard to carry or conceal. To this end, the frequency of the interrogating field should be as low as possible so as to be able to penetrate the walls of a shielding box.

Alternatively, to the pattern formed by 151 and 152, ferromagnetic material could be made to coincide with the normal pattern of the currency. The emblematic pattern 155 could be used for one strip of the pair, and the amount pattern 156 could be used for the other. These two strips could be designed to have the same essential lengths, widths, thickness, and weights so that the pair would be magnetically balanced as before described. Indeed, it is entirely possible that each piece of currency could be given an identifiable magnetic design of as much complexity as the optical design—a complexity so great that illicit traffic in money could be stopped altogether.

Again, L-shaped pieces of high coercivity ferromagnetic material could be made to overlay L-shaped pieces of low coercivity ferromagnetic material, with the gaps of the latter coming at diagonal corners, as shown in FIG. 24, and the gaps of the high-coercivity material coming at the other diagonals. With this arrangement, the deactivation procedure of my U.S. Pat. No. 3,747,086 could be practiced.

FIG. 25 is a schematic circuit diagram of a synchronous, or coherent detector, that is used in the detection and analysis of signals picked up by loop 92 in the interrogation zone in the practice of this invention. Terminal pairs a, b; c, d; and e, f coincide with similarly identified terminal pairs of FIG. 15. Thus, the harmonics selected by 95 are applied through transformer $T_1$ to the rectifier ring, comprised of $CR_1$, $CR_2$, $CR_3$, and $CR_4$, as shown. The reference voltage, which is to say, the fundamental driving voltage applied to loop 92 is applied through transformer $T_2$ to the center-tap of the secondary of $T_1$ and to the midpoint of the two equal resistors $R_1$ and $R_2$, and hence symmetrically into the rectifier ring. Accordingly, the rectifiers are switched with the period of the voltage applied to loop 92 so that any pickup by loop 92, and passed to terminals a, b, that is not synchronous with the applied voltage will be averaged out. This detector is also phase sensitive with respect to the reference voltage so that the polarity of the d-c voltage appearing across terminals e, f reverses whenever the voltage across terminals a, b changes by 180° with respect to perfect synchronism, and this fact can by itself be used to determine the status of ferromagnetic markers passing through doorway 90, without resort to whether the harmonics are predoninately even or odd, or otherwise form some pre-determined identifiable pattern. The synchronous, or coherent, detector, sometimes also called a ring detector or demodulator, is a powerful tool when applied to the circuitry of the present invention.

FIG. 26 shows an arrangement of three radiation and/or pickup loops 141, 142 and 143, the planes of which are mutually orthogonal. Such an arrangement is preferred in the practice of the present invention, both for the check-out stand and the interrogation doorway. The loops would be so disposed with respect to the pathway through them, as defined by arrow 144, that the path would make an approximate 45° angle with the planes of all three loops. Accordingly, if the conductors forming the three loops are connected in series, and all three loops have the same number of turns and enclose areas of the same size, no ferromagnetic marker could ever be more than 45° off a perfect orientation with respect to at least one loop, and hence the level of response never worse than max/$\sqrt{2}$, or approximately 0.7 max. Considering that tagged goods can be moved about with the ferromagnetic markers having all posible orientations, this arrangement of check-out and interrogation zones makes it possible to do a much better engineering job than is otherwise possible, because the maximum variations are bounded. While in places such as libraries, where the tagged goods all have a common general shape and prescribed limits of sizes, as well as definitive locations for the ferromagnetic markers, the orthogonal loop system of FIG. 26 might not have too great an importance, it seems almost mandatory in places such as large department stores where merchandise of so many sizes, shapes and descriptions is sold, and where shop-lifters employ a wide variety of schemes to hide what they are stealing. Considering the many forms in which wood, aluminum alloys, and stainless steels are available today, artistic arrangements of the loops of FIG. 26 could be worked-out by architects so that an interrogating doorway would neither be ugly or obvious. Too, if the goods sold by the several departments of the store are packaged in prescribed ways, the packages could be placed on a conveyor and readily carried through a set of orthogonal re-orienting check-out loops.

While manifold other arrangements of ferromagnetic markers, methods and systems of switching marker configurations, and methods and systems of detecting marker configurations, may be possible, the fundamental ones have been disclosed herein, and minor variations would not be considered to depart from the means, method and system of this invention.

What is claimed is:

1. A marker for being secured to an object to enable detection of the presence, identity or status of the object within an interrogation zone having a magnetic field varying at a predetermined fundamental frequency, and produced by radiating means, said marker comprising:

Two identical pieces of ferromagnetic material geometrically aligned with each other, separated by a gap and selectively formed magnetically by magnetic charging means to produce pairs of two kinds:

An opposing pair with like poles in the two pieces facing at the gap; or

An aiding pair with unlike poles in the two pieces facing at the gap; Wherein the opposing and aiding pairs produce identifiably different responses to the varying magnetic field of the interrogation zone.

2. A marker according to claim 1 wherein the two identical pieces of said pairs are long, narrow, thin strips positioned and held in alignment by non-magnetic material.

3. A marker according to claim 2 wherein said strips are aligned in a lengthwise relationship along an axis which passes through the centers of all four magnetic poles, said gap being between two adjacent ends.

4. A marker according to claim 2 wherein said strips are adjacent, parallel and generally aligned in facing relationship with each other, said gap being between two of the four principal areas of the strips, called faces, and maintained by a prescribed thickness of non-magnetic material there between.

5. A marker according to claim 2 wherein said strips are aligned in a side-by-side parallel plane relationship, said gap generally beteeen two adjacent long thin edges and maintained by a prescribed width of non-magnetic material.

6. A marker according to claim 2 wherein said non-magnetic material is comprised of the paper and other material of which currency is formed, said pairs dimensioned to come within the bounding limits of a prescribed piece of currency, said paper and other materials fully covering said pairs and formed, cut, printed and processed to make a piece of currency under the laws of a governmental agency.

7. A marker according to claim 2 wherein said opposing pair causes predominately even-ordered harmonics of the fundamental frequency to be generated and radiated into said interrogation zone, and wherein said aiding pair causes predominately oddordered harmonics of the fundamental frequency to be generated and radiated into said interrogation zone.

8. A marker according to claim 2 wherein said magnetic field verying at a fundamental frequency is a sinusoidally varying magnetic field.

9. A marker according to claim 2 wherein said magnetic field varying at a fundamental frequency is a periodic sequence of square waves.

10. A marker according to claim 2 wherein said magnetic field varying at a fundamental frequency is a periodic sequence of sawtooth waves.

11. A system for detecting a characteristic of an object when said object is in an interrogation zone having a magnetic field periodically varying at a predetermined fundamental frequency, said system comprising:

Marker means for being secured to an object comprising a pair of identical ferromagnetic elements capable of generating a detectable signal containing harmonics of said fundamental frequency when placed in said zone, said pair of identical elements having two states of magnetization, a first of said two states having said elements magnetized in opposition, a second of said two states having said elements magnetized to aid each other, said signal generating capability differing for two said states of magnetization;

Radiating means for producing within said interrogation zone said periodically varying magnetic field;

Receiving means for detecting the harmonic content of the signal produced by said elements; and Security readout and communication means coupled to said receiving means responsive to said signal to indicate said characteristic of an object in accordance with said harmonic content.

12. The system of claim 11 wherein said magnetic field zone has a peak intensity less than the coercivity of either element of the pair.

13. A system according to claim 12 further comprising:

Means for altering the magnetization state of said marker prior to said marker being placed in said interrogation zone, such that said alteration is recognizable by the harmonic content of the signal produced upon passage of said marker through said interrogation zone.

14. A system according to claim 13 wherein said means for altering the magnetization of said marker further comprises three loops whose planes are mutually orthogonal and connected in series whereby said marker secured to said object taking a path of approximately 45° through and with respect to said three loops receives no less than 0.7071 maximum force for altering said magnetization state regardless of the orientation of said marker secured to said object.

15. A system according to claim 12 wherein said receiving means further comprises an electronic device for selecting even and odd harmonics of said fundamental frequency present in said signal and for delivering to said security readout and communication means a voltage proportional to the ratio of selected even and odd harmonics of said fundamental frequency.

16. A system according to claim 12 wherein said receiving means further comprises a coherent detector whereby all components of said received signal except those which are synchronous with said fundamental frequency are eliminated from the output of said received signal.

17. A system according to claim 12 wherein said radiation means further comprises three loops whose planes are mutually orthogonal and connected in series whereby said object taking a path of approximately 45° through and with respect to said three loops intercepts no less than 0.7071 maximum intensity of said fundamental of said magnetic field, regardless of the orientation of said marker secured to said object.

18. A system according to claim 12, wherein said receiving means further comprises three loops whose planes are mutually orthogonal and connected in series whereby said object taking a path of approximately 45° through and with respect to said three loops produces a signal no less than 0.7071 maximum possible signal, regardless of the orientation of said marker secured to said object.

19. A system for detecting magnetic characteristics of an object when said object is in an interrogation zone having a magnetic field periodically varying at a predetermined fundamental frequency, according to claim 11, said system further comprising:

Signal level comparison means; and

Security means coupled to said signal level comparison means which, regardless of harmonic content, responds to pre-determined maximum and minimum levels of signals.

20. A method for detecting a characteristic of an object when the object is in an interrogation zone having a magnetic field periodically varying at a fundamental frequency, said method comprising:

Securing to an object a marker comprising two identical ferromagnetic elements having two magnetization states which produce different harmonic responses of said fundamental frequency;

Radiating within said interrogation zone said magnetic field having a peak intensity less than the coercivity of said identical ferromagnetic elements;

Receiving said harmonic responses produced by said magnetic elements upon excitation by said varying magnetic field;

And responding to said harmonic responses to produce an indication of the characteristics of an object in accordance with said harmonic content.

21. A piece of currency containing ferromagnetic material that can be put in at least one magnetic state when it is within a bank or other monetary institution, and that can be put in at least one other state when outside said bank or institution and in general circulation, said magnetic states giving rise to identifiably different sets of harmonic signals when said piece of currency is carried through an interrogation zone having a magnetic field varying at a predetermined fundamental frequency, said ferromagnetic material comprised of two L-shaped strips bound within the paper out of which said currency is fabricated and occupying positions adjacent the perimeter of said currency and separated by gaps at two diagonal corners.

22. A piece of currency containing ferromagnetic material that can be put in at least one magnetic state when it is within a bank, or other monetary institution, and that can be put in at least one other magnetic state when outside said bank or institution and in general circulation; said magnetic states giving rise to identifiably different sets of harmonic signals when said piece of currency is carried through an interrogation zone having a magnetic field varying at a predetermined fundamental frequency; said ferromagnetic material comprised of four L-shaped strips bound within the paper out of which said currency is fabricated, each L-shaped strip having essentially the dimensions of a length and width of said currency, Two of said strips fabricated from low-coercivity high-permeability material and placed within said currency to form a first layer of material with gaps at two diagonal corners, The remaining two of said four strips fabricated from high-coercivity, low-permeability material and placed within said currency to form a second layer of material with gaps at diagonal corners different from the diagonal corners utilized by said first layer of material, said first and second layers in magnetic proximity to each other.

* * * * *